United States Patent
Capuani

(10) Patent No.: US 8,113,459 B2
(45) Date of Patent: Feb. 14, 2012

(54) HIGH-SECURITY AIRCRAFT

(75) Inventor: Alfredo Capuani, Turin (IT)

(73) Assignee: Nimbus S.R.L., Lombardore (IT)

( * ) Notice: Subject to any disclaimer, the term of this patent is extended or adjusted under 35 U.S.C. 154(b) by 901 days.

(21) Appl. No.: 11/922,506

(22) PCT Filed: Jul. 7, 2005

(86) PCT No.: PCT/IT2005/000387
§ 371 (c)(1),
(2), (4) Date: Dec. 19, 2007

(87) PCT Pub. No.: WO2007/007353
PCT Pub. Date: Jan. 18, 2007

(65) Prior Publication Data
US 2009/0108126 A1  Apr. 30, 2009

(51) Int. Cl.
*B64C 3/30* (2006.01)
(52) U.S. Cl. ........................ 244/5; 244/35 R; 244/123.11
(58) Field of Classification Search .............. 244/5, 24, 244/25, 29, 30, 125, 128, 12.1, 13, 900, 901, 244/903
See application file for complete search history.

(56) References Cited

U.S. PATENT DOCUMENTS

| 3,135,483 | A | * | 6/1964 | Girard | 244/99.11 |
| 3,151,825 | A |   | 10/1964 | Kindling | |
| 3,270,895 | A | * | 9/1966 | Stewart | 212/71 |
| 3,970,270 | A | * | 7/1976 | Pittet, Jr. | 244/5 |
| 4,158,448 | A |   | 6/1979 | Mochizuki et al. | |
| 4,596,368 | A | * | 6/1986 | Schmittle | 244/48 |
| 4,858,854 | A | * | 8/1989 | Jacobson | 244/123.11 |
| 6,688,553 | B2 | * | 2/2004 | Hsia | 244/35 R |

FOREIGN PATENT DOCUMENTS

| DE | 28 40 466 A1 | 3/1980 |
| DE | 199 24 467 A1 | 11/2000 |
| EP | 0 768 238 A | 4/1997 |
| FR | 2 669 602 A | 5/1992 |

* cited by examiner

*Primary Examiner* — Joshua Michener
*Assistant Examiner* — Brian M O'Hara
(74) *Attorney, Agent, or Firm* — Modiano & Associati; Albert Josif; Daniel J. O'Byrne

(57) ABSTRACT

An aircraft comprising an elongated framework provided with propelling means and direction-control planes. The framework is coupled to a pneumatic chamber suited to be filled with lighter-than-air gas and comprising two tubular branches joined to form a V-shaped profile, with an aerodynamic-lift surface extending therebetween.

14 Claims, 3 Drawing Sheets

HIGH-SECURITY AIRCRAFT

BACKGROUND OF THE INVENTION

Aerostatic-lift aircrafts are known (commonly called airships, or dirigibles), which comprise a horizontal tube filled with lighter-than-air gas, such as helium, with associated propelling means and direction-control means. Airships, depending on size, may be provided with a pilot cabin to accomodate a crew, and possibly with a passenger compartment and/or with a freight bay.

Airships have attracted some interest in the past because of their low-power requirements, allowing for unsophisticated engines, of their ability to take-off and land without a need for a dedicated airstrip, and also because they can remain airborne even in case of engine breakdown. Consequently, there have been attempts to broaden the use of airships to different applications, such as terrain-surveillance missions, reconnaissance, freight-and-passenger transport, and other. On the other hand, airships are also regarded as a safe and reliable aircraft, because, due to the volumes and to the limited pressures of their inflated tube, the airship, even in case of tube puncturing, is able to remain airborne for several hours, or at least to descend slowly and without risks.

In spite of the above considerations, the use of airships has been limited until now, in contrast to the more widespread aerodynamic-lift aircrafts, such as aeroplanes and helicopters, mainly because of their low cruising speed and consequent low yeld, and because of their difficult control during hoevering, particularly in case of air currents, however weak, or, even worse, in case of wind gusts.

Another drawback of the conventional airships, as known to persons skilled in the field, is that their mooring is awkward, particularly before the freight, equipment and staff have been loaded. In fact, the airship is suitably sized in relation to the limit load it is meant to carry, i.e., it must be able to take-off even under full-load conditions. By contrast, under unloaded conditions, the aerostatic thrust is excessive because only opposed by the empty weight of the airship, so that the latter requires sturdy mooring structures to be kept down on the ground, which structures, however, are often difficult to locate.

A further drawback of the conventional airships is that, due to their cylindrical profile, they are intrinsically unbalanced and require tail planes to maintain a level trim in flight.

However, one of the most frequent inconveniences with the airships is the loss of the rigid tail planes, because their connection to the nonrigid tube is very awkward, which circumstance causes the airship to become completely uncontrollable and to tilt to a transversal arrangement, with rise of aerodynamic forces and consequent structural collapse.

A further drawback of the airships is they are very sizable compared with their carrying capacity, so that, with heavy loads, huge aircraft must be used.

On the other hand, the conventional aerodynamic-lift aeroplanes have drawbacks as well, such as that they need a sophisticated air-traffic control system, as well as long airstrips for taking-off and landing at organized terminals, which, however, have high equipping-and-mainteinance costs.

Furthermore, in order to provide a reasonable degree of safety with any flight condition, airplanes require redundancy of engines and flight systems and, in case of engine breakdown, they must suspend the mission and land to the nearest airport in conditions of priority.

Of course, the above drawback is even more serious with the helicopters because, in case of engine breakdown, only attempts may be made to damp the crash by means of a complex auto-rotation maneuver, with uncertain results.

A further drawback of all the conventional aerodynamic-lift aircrafts is the high-fuel consumption and, consequently, the limited endurance because, though the enough high efficiency, high power is required to fly.

SUMMARY OF THE INVENTION

Therefore, it is a main object of the present invention to provide an aircraft which combines the good features of both the above groups of aircrafts, i.e., aerostatic-lift aircrafts and aerodynamic-lift aircrafts, and, at the same time, overcomes the drawbacks thereof, with a very high degree of safety.

It is another object of the invention to provide an aircraft which has high stability in flight, independently from the flight speed, even in case of strong air currents and wind gusts, and which is easy to control, with a low responsiveness to any mistake of the pilot.

The above objects and other advantages, which will better appear below, are achieved by the aircraft having the features recited in claim 1, while the other claims state other advantageous, though secondary features of the invention.

BRIEF DESCRIPTION OF THE DRAWINGS

The invention will be now described in more detail with reference to a few preferred, non-exclusive embodiments, shown by way of non-limiting example in the attached drawings, wherein:

FIG. 3 is a plan view of the aircraft of FIG. 1,

FIG. 4 is a side elevation view showing a part of the aircraft of FIG. 1 separately;

DESCRIPTION OF THE PREFERRED EMBODIMENTS

Figure 1:
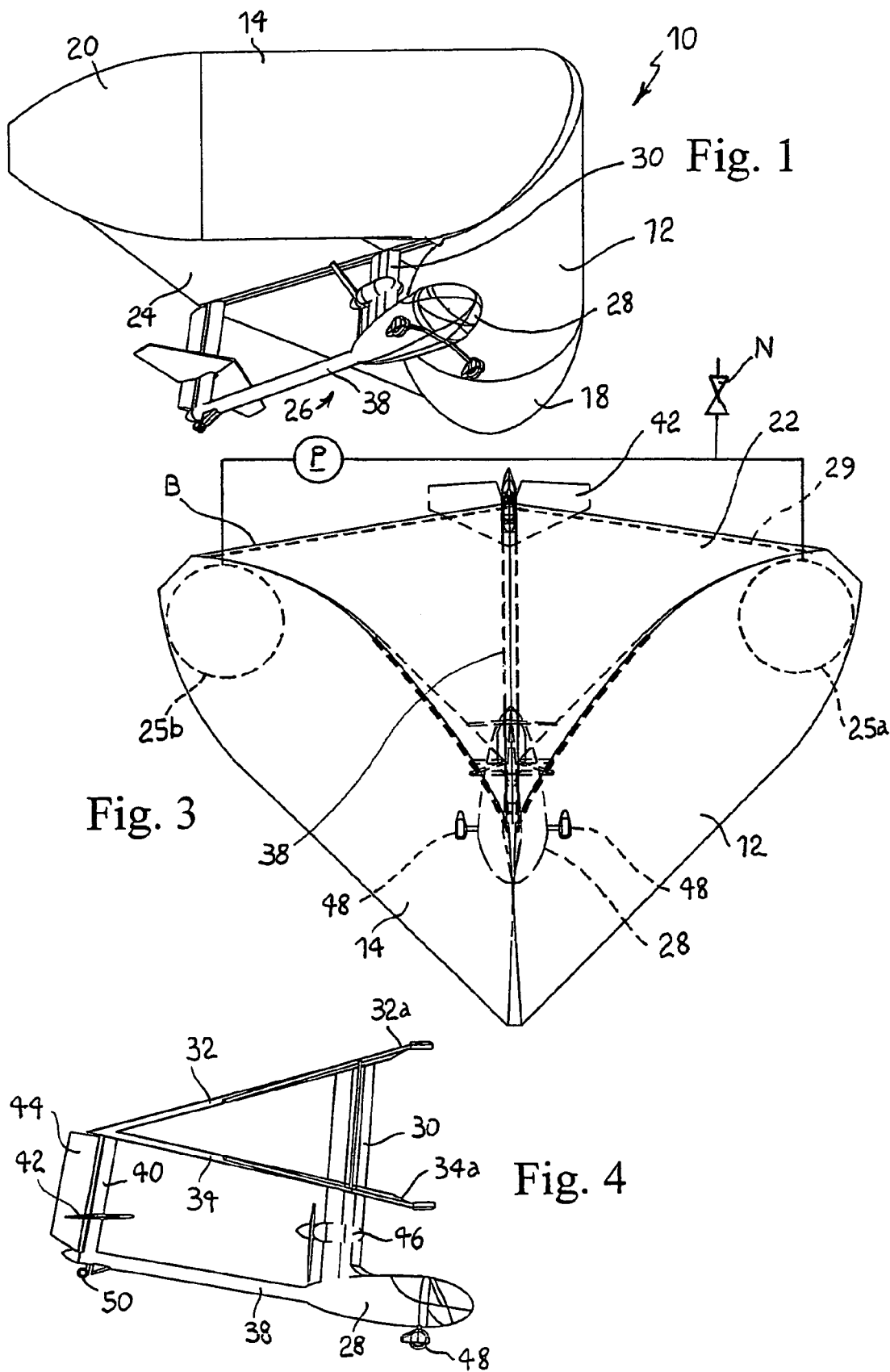
FIG. 1 is a perspective view of the aircraft according to this invention.
Figure 2:
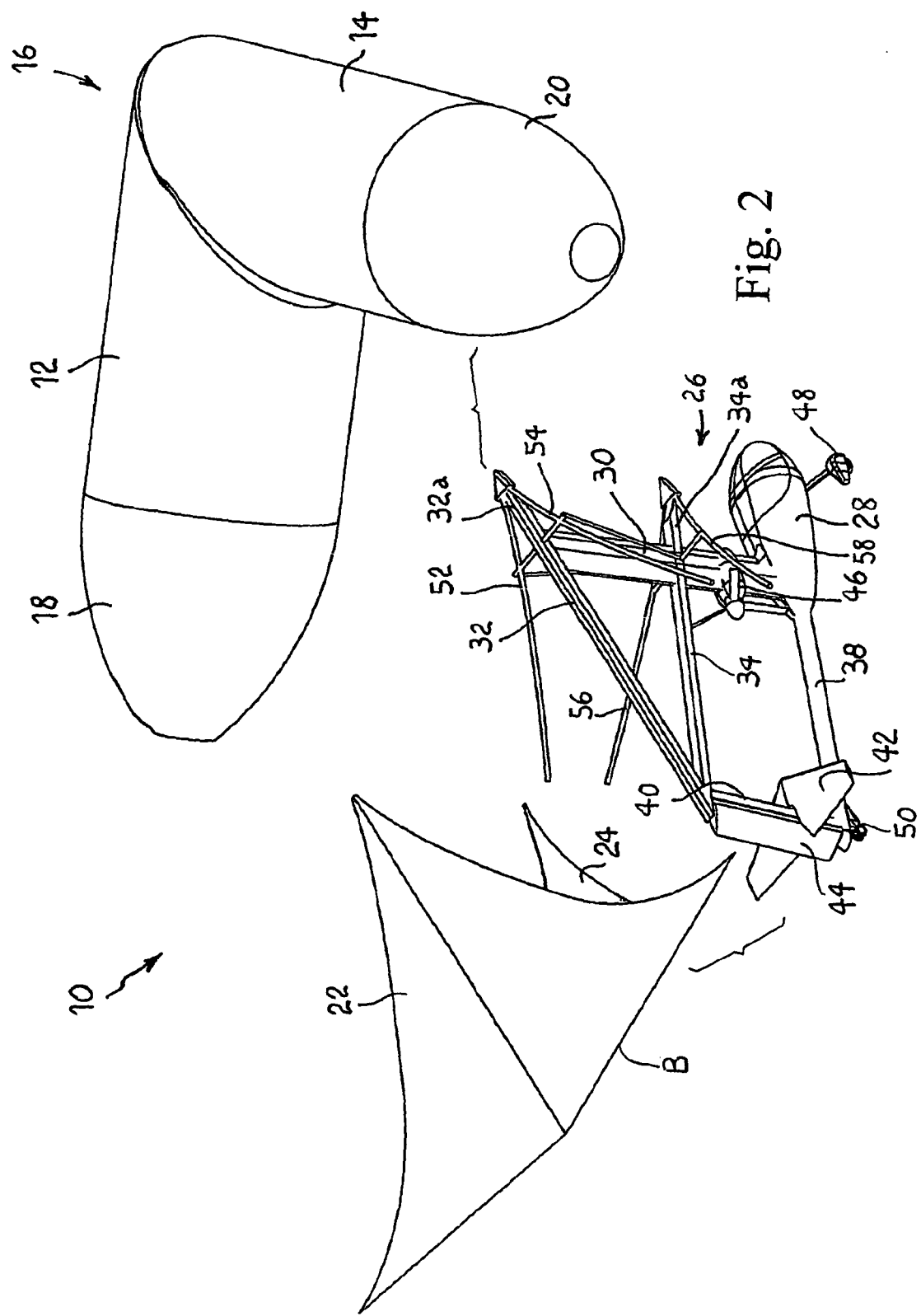
FIG. 2 is an exploded, perspective view of the aircraft of FIG. 1.

With reference to the above Figures, an aircraft 10 according to this invention comprises a pair of tubular branches 12, 14 which are joined at right angles to form a V-shaped pneumatic chamber, generally referenced with 16, and are closed at their opposite ends by respective, tapered end-portions 18, 20. Pneumatic chamber 16 is filled with lighter-than-air gas, preferably helium. A pair of sails 22, 24 stretched between tubular branches 12, 14 are suitably shaped to match the inner profile of tubular branches 12, 14 and converge progressively from the vertex of the V to meet into a delivery edge B, which is defined between the opposite ends of the tubular branches.

As shown in FIG. 3, a pair of pneumatic balloons 25a, 25b are housed within the pneumatic chamber at the opposite ends of tubular branches 12, 14 and are operatively connected to a normally closed valve N leading to atmosphere, and to a pump P within the aircraft (only diagrammatically shown in FIG. 3), for the tasks that will be explained below.

Pneumatic chamber 16 supports an elongated framework 26 provided with propelling means and tail planes, which will be described in more detail below, as well as with a pilot cabin 28.

Framework 26 comprises a rigid mounting frame which is clamped between the inner vertex of the V and a rope 29, or any other elongated tensioning member such as a rigid beam (only diagrammatically shown in FIG. 3), pulling on the opposite ends of tubular branches 12, 14. The mounting frame comprises an upright 30 biased against the inner vertex of pneumatic chamber 16, and a pair of skew longitudinal beams 32, 34 which project backwards from upright 30 at different heights and join at their rear ends, where they are engaged by rope 29. The front ends 32a, 34a of the beams project forwards from upright 30 and enclose the vertex of pneumatic chamber 16 at respective opposite sides thereof. Upright 30 has a flat, tapered profile.

In the embodiment shown by way of example in the Figures, pilot cabin 28 is supported at the lower end of upright 30 and has a tail 38 connected to longitudinal beams 32, 34 via a fin 40. The tail planes comprise a horizontal tail surface 42 and a rudder 44 supported on fin 40, both operable from cabin 28 via drive means (not shown), in a conventional way in the field. A propeller engine 46 is supported on upright 30, between cabin 28 and the lower longitudinal beam 34, with its propeller facing backwards.

Aircraft 10 is provided with landing gears 48, 50 which are respectively connected to cabin 28 and to the rear end of tail 38.

Two pairs of stiffening rods 52, 54 and 56, 58, project backwards from the front ends 32a, 34a of the longitudinal beams and are shaped to match the profile of tubular branches 12, 14 along the joining area with upper sail 22 and lower sail 24 respectively.

Contrary to expectations, it has been found in practice that the above combination of the profiles of pneumatic chamber 16 and sails 22, 24, despite its non-aerodynamic appearance, provides an aerodynamic lift which is sufficient to sustain the aircraft in flight, when combined with the aerostatic lift generated by the volume of helium in pneumatic chamber 16. Particularly, the pneumatic chamber is suitably sized depending on the load to be carried, in order that the 20-40% of the aircraft-supporting action is obtained by aerostatic lift. The remaining 60-80%, which comprises the payload and the fuel, is obtained by aerodynamic lift. Accordingly, the aircraft does not require mooring structures to be kept down on the ground at rest, because the aerostatic lift is not sufficient to lift the aircraft. On the other hand, the volume of the pneumatic chamber of aircraft 10 provides a large wing area which, when combined with the aerostatic lift, allows aircraft 10 to take-off and land at very low speeds, with very short take-off/landing runs, because an aerodynamic pressure is required which is about ⅓ of the pressure required for lifting a conventional airplane supported exclusively by aerodynamic lift, for equal weight.

It has been found that the above V-shaped pneumatic chamber 16 consisting of two tubular branches joined at right angles for improving the directional stability, in combination with sails 22, 24 arranged as above, provides an optimum aerodynamic-lift surface because, with this arrangement, the barycenter of the aerostatic lift matches with the barycenter of the aerodynamic lift. Such circumstance, toghether with the "suspended" arrangement of the load below pneumatic chamber 16, provides the aircraft with autostability in flight, with a pendulum-like balance which merely requires vertical-and-directional control, so that pilotage is made considerably simpler. This circumstance provides the aircraft with surprising stability and maneuverability in flight, with unresponsiveness to air currents and wind gusts, as well as to any mistakes of the pilot, so that the aircraft is very easy to control.

Since helium expands as the aircraft climbs, because the atmospheric pressure progressively diminishes, such effect is compensated, while climbing, by opening valve N to progressively deflate balloons 25a, 25b within tubular branches 12, 14, as well as, while descending, by operating pump P to inflate the balloons. Furthermore, the above arrangement of the balloons at the opposite ends of the tubular branches has a further advantageous effect that the relative variation of the volume of helium in the chamber with respect to the volume of air in the balloons, while climbing or descending, causes the aerodynamic-lift barycenter of the aircraft to shift and, consequently, the longitudinal angle of attack to change, whereby such angle rises while climbing, with advantages in terms of flight stability.

The low speeds required for taking-off, cruising and landing, also make the aircraft according to this invention very advantageous from the standpoint of the safety, both because they allow the pilot to maneuver leisurely, mainly while taking-off and landing, which maneuvers are generally regarded as the more critical, and because, in case engine breakdown, the aircraft can descend at low speed.

Moreover, the low cruising speed of the aircraft leads to a considerable reduction of the consumption and, consequently, to an increased endurance.

The aircraft according to the invention is suitable for various applications, such as terrain-surveillance missions, reconnaissance, freight-and-passenger transport, and other, where the size will be chosen depending on the specific requirements. Furthermore, this aircraft is particularly and advantageously suited for fire-quenching missions, due both to its static stability, which will be only slightly affected by the ascending currents generated by the fire, and to its low cruising speed, which allows the aircraft to safely carry out the difficult maneuvers of picking up the water and downloading it into the area affected by the fire.

Figure 5:
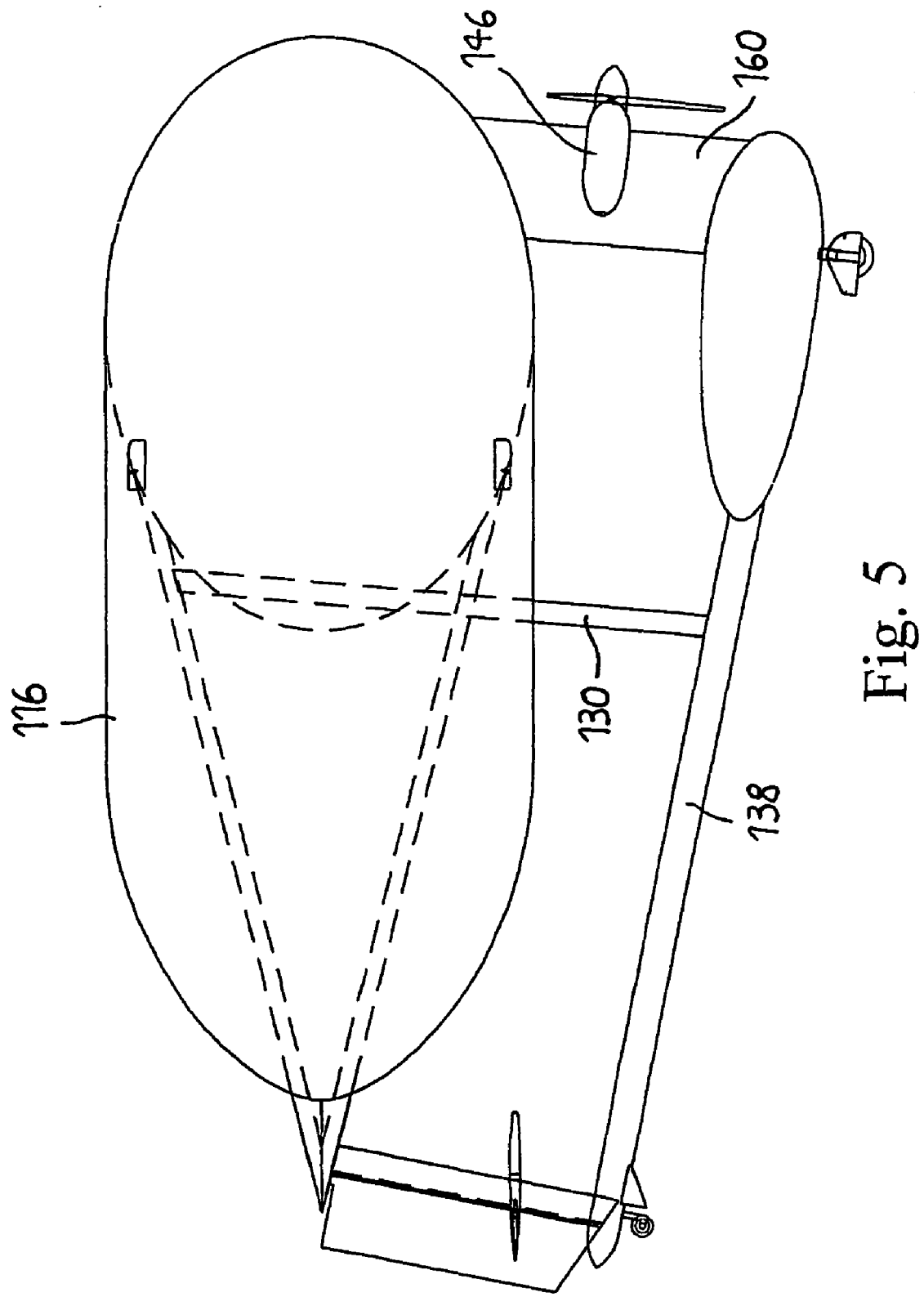
FIG. 5 is a side elevation view of the aircraft according to an alternative embodiment of the invention.

In the alternative embodiment of FIG. 5, where the parts corresponding to the previous embodiment are referenced with the same number increased with 100, engine 146 is supported at an advanced position on a fin-shaped support 160 affixed to the front end of the framework, with the propeller facing forwards. In such embodiment, the upright consists of a bar 130.

Of course, though a few preferred embodiments of the invention have been described herein, many changes may be made by a person skilled in the art within the scope of the inventive concept. In particular, the shape of the framework associated to the pneumatic chamber can be extensively varied, e.g., in case of sizable aircrafts, other stiffening elements could be added, as will be evident to a person skilled in the art. Particularly, a stiffening ring could be arranged along the joining area of the tubular branches. Furthermore, landing gears 48, 50 could be substituted by other means for supporting the aircraft on the ground, such as floats for taking-off/landing on the water, skids, and the like. Moreover, the aircraft could be also provided with a freight bay, in a way similar to the conventional aerocargo, and/or with passenger compartments of different sizes.

Furthermore, the aircraft could be provided with more engines supported at the opposite sides of the aircraft, instead of with a single engine connected to the framework along the middle line thereof, as shown in the above preferred embodiments. The type of engine used could also be different, depending on the specific requirements, in particular, ducted-propeller engines can be used.

Moreover, all the parts which are not essential for the invention can be omitted. For example, stiffening rods 48, 50 and 52, 54 will be particularly useful, though unessential, in case of sizable tubes, while the own stiffness of the pneumatic chamber filled with helium could be sufficient in case of small tubes.

What is claimed is:

1. An aircraft comprising an elongated framework provided with propelling means and direction-control planes and anchored to a wing-contoured member, wherein said wing-contoured member consists of:
- a pneumatic chamber made of a flexible sheet and filled with a pressurized, lighter-than-air gas to assume a self-sustaining configuration consisting of two tubular branches joined to form a V-shaped profile,
- an aerodynamic-lift surface with an upper sail and a lower sail, both said upper sail and said lower sail extending between the tubular branches of the chamber and shaped to match the inner profile of the tubular branches from the vertex of the V-shaped profile to a delivery edge defined between the diverging ends of the tubular branches, said upper sail and said lower sail being arranged mutually distally at the vertex of the V-shaped profile and said upper sail and said lower sail mutually converging progressively from said vertex of the V-shaped profile to mutually meet into said delivery edge, and
- two pneumatic balloons housed at respective opposite ends of the tubular branches, whereby a self trim effect of pitch down is obtained at high altitude, which is suitable for high speed flight, as well as of pitch UP at low altitude, which is suitable for landing attitude, said pneumatic balloons being air-filled and connected to a normally closed valve leading to the atmosphere and in pressure equilibrium with the pneumatic chamber, whereby opening the valve during ascent bleeds the balloons to reduce the volume thereof, and said pneumatic balloons being also connected to an air pump operable to feed air from the atmosphere into the balloons to increase the volume of the balloons during descent.

2. The aircraft of claim 1, wherein the vertex angle of said V-shaped profile is in the range 45° to 120°.

3. The aircraft of claim 2, wherein the vertex angle of said V-shaped profile is substantially 90°.

4. The aircraft of claim 1, wherein said tubular branches terminate at their opposite ends with respective tapered end-portions.

5. The aircraft of claim 1, wherein said framework comprises an elongated, rigid mounting frame clamped between the inner vertex of the V-shaped profile and an elongated tensioning member pulling on the opposite ends of the tubular branches.

6. The aircraft of claim 5, wherein said mounting fame comprises an upright biased against the inner vertex of the V-shaped profile, and at least one longitudinal beam projecting backwards from the upright and engaged at its rear end by said elongated tensioning member.

7. The aircraft of claim 6, wherein said upright projects downwards from said vertex of the V-shaped profile.

8. The aircraft of claim 6, wherein said mounting frame comprises a pair of longitudinal beams affixed to the upright at different heights and mutually connected at their rear ends, with their front ends projecting forwards from the upright to enclose the vertex of the V-shaped profile on respective opposite sides thereof.

9. The aircraft of claim 6, comprising a tail projecting backwards from the upright and connected to said mounting frame via a rear fin.

10. The aircraft of claim 8, comprising stiffening rods integral with said mounting frame and suitably shaped to match the profile of the tubular branches along the joining area with the sails.

11. The aircraft of claim 1, wherein said propelling means comprise at least one propeller engine supported on the framework along the middle line thereof.

12. The aircraft of claim 11, wherein said engine is affixed to the upright in a vertically spaced position from the wing-contoured member near the lower end of the upright.

13. The aircraft of claim 11, wherein said engine is supported at the front end of the framework with its propeller facing forwards.

14. The aircraft of claim 1, wherein said chamber is sized such that the percentage of the aircraft-supporting action obtained by aerostatic lift, in relation to the specific lighter-than-air gas of which the chamber is inflated, is in the range 20% to 40% of the overall supporting action, the remaining percentage being obtained by aerodynamic lift.

* * * * *